Aug. 25, 1953  L. M. IBAÑEZ RODRIGUEZ  2,650,175
SUGAR CRYSTALLIZER
Filed June 6, 1951  2 Sheets-Sheet 1

INVENTOR:
Luis M. Ibañez Rodriguez,
BY Singer, Stern & Carlberg
ATTORNEYS.

Aug. 25, 1953  L. M. IBAÑEZ RODRIGUEZ  2,650,175
SUGAR CRYSTALLIZER
Filed June 6, 1951  2 Sheets-Sheet 2
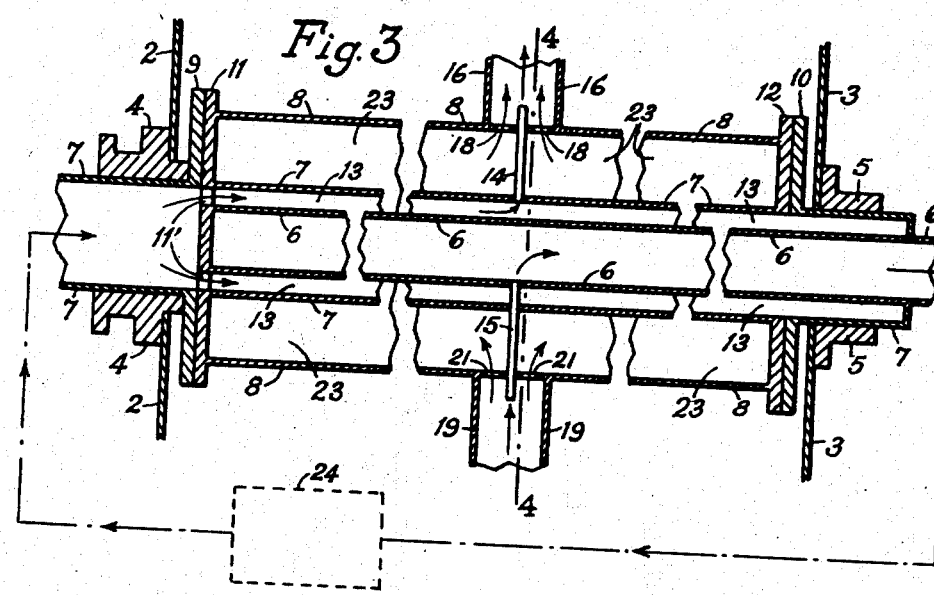
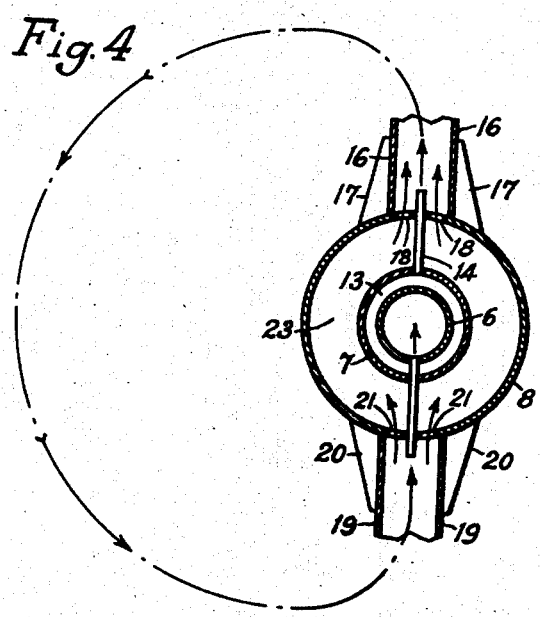
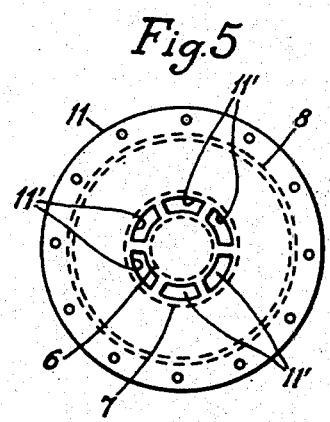
INVENTOR:
Luis M. Ibañez Rodriguez
By Singer, Stern & Carlberg
ATTORNEYS.

Patented Aug. 25, 1953

2,650,175

UNITED STATES PATENT OFFICE 2,650,175

SUGAR CRYSTALLIZER

Luis M. Ibañez Rodriguez, Marianao, Havana, Cuba

Application June 6, 1951, Serial No. 230,099
In Cuba June 21, 1950

5 Claims. (Cl. 127—15)

This invention particularly relates to the cooling of cooked sugar masses in the crystallizing apparatus at present used, and it has for its object to provide a method of uniformly cooling cooked sugar masses to obtain mollasses of a low coefficient of purity in a shorter period of time than is at present required, as well as to provide a method of uniformly reheating cooked sugar masses when after the latter have been cooled in the crystallizing apparatus the same are to be transferred from the crystallizers to the centrifugal machines for the purging operation.

The process at present carried out at sugar factories to obtain molasses of a low coefficient of purity comprises cooling the cooked masses at the crystallizers and reheating the mass at the centrifugal mixers as the purging operation is being effected. The cooling increases the oversaturation of the mother liquor in the cooked mass and induces a further crystallization of the sucrose on the formed crystals. Reheating is necessary in order to facilitate the operation of the centrifugal machines, as it reduces the viscosity of the cooked mass without dissolving the formed crystals.

Within the limits determined by the apparatus at present in operation at a sugar factory, certain conditions may be established to attain the best results. Experience has led to the setting of certain basic requirements which must be fulfilled in order to attain a maximum exhaustion of molasses. Such requirements may be briefly described as follows.

Time

The period of time necessary for the cooling of cooked sugar masses is dependent upon the nature of the non-sugar components and the degree of purity of the cooked mass, as also upon the characteristics and operation of the crystallizers. It has been demonstrated that the exhaustion of molasses is proportional to the square root of the time and to the fourth root of the temperature decrease; consequently, time influence is greater than cooling influence. It has further been demonstrated that high-purity molasses are the result of limiting the required time and cooling rate for obtaining maximum exhaustion conditions. The cooling rate must not be too high as granulation would be formed in the cooked mass. Temperature must not be excessively low, to avoid an excessive viscosity of the mother liquor. It is of the utmost importance to limit the differential between the temperature of water used for cooling purpose and the temperature of cooked mass to a point where no false grains are formed on the surface of the cooling apparatus.

When cooked mass is reheated after cooling, the temperature of the points of contact with the surface of the heating coil must not exceed the saturation temperature of the cooked mass.

Motion

It is admitted as a general principle that exhaustion may be improved by increasing the agitation of the cooked mass. Generally, the more vigorous the agitation, the quicker and broader the exhaust action of sucrose in the molasses.

Fluidity of cooked mass

As the temperature is decreased in the crystallizer, the viscosity is increased if the cooling operation is carried out too quickly. The cooling operation must be maintained about within the crystallization regime of sucrose. A constant oversaturation must be maintained during the cooling period, within reasonable limits.

From the foregoing it is concluded that the cooked-mass cooling and reheating mechanisms must meet certain essential requirements. Of course, it is of the utmost importance that the temperature differential be maintained about equal throughout the cooked mass in the crystallizer. Cool water must not be allowed to directly contact the cooling surface as otherwise a too high oversaturation would be caused at said point, which would induce the formation of granulates.

The method of this invention consists in injecting hot-water or cold-water streams or steam into the rotatable shaft of the crystallizer and out of direct contact with the cooling or reheating surface of the said shaft which is in direct contact with the cooked mass contained in the crystallizer, in mixing said hot or cold water or steam with the water contained in the crystallizer shaft and being in direct contact with the shaft cooling or reheating surface, and in causing the water contained in the crystallizer shaft by virtue of the impulse action of said fine streams of hot-water or cold-water or steam to recycle through tubular elements acting as agitators and forming flow courses across the cooked mass contained in the crystallizer and outside the rotatable shaft thereof, to thereby obtain with the minimum consumption of water the greatest uniformity of temperature throughout the cooked mass and with a minimum difference of temperature between the cooked mass and the cooling or reheating surfaces of the rotatable shaft of the crystallizer.

The apparatus for carrying out the described method is composed of two concentric tubes disposed within the tubular rotatable shaft of the crystallizer, thereby forming three concentric tubes and two annular spaces between them of which the outermost space is in direct contact with the cooling or reheating surface being the wall of the outermost tube, and the inner annular space is out of direct contact with the cooling or reheating surface. The outermost hollow space is adapted to contain water which is heated or cooled by direct contact with said cooling or reheating surface, whereas the innermost hollow space is adapted to receive steam or hot water or cold water under pressure which is impulsed by an outer pump and which is injected in thin streams by means of spaced apart radial tubes leading from the intermediate concentric tube that forms the rotatable shaft and entering into caps or heads radially arranged on the outer tube, the bases of said caps or heads at the wall of the outer tube being provided with perforations communicating the interior of said heads with the outermost hollow space, so that water from the latter will enter the heads to be mixed there with the water stream and to be impulsed onward by the action of the pressure injected streams of cold water or hot water or steam and by communicating every two diametrally opposed heads on the outer tube by means of narrower tubes in the shape of a spiral or other shape within the cooked mass contained in the crystallizer, a uniform increase or decrease of temperature in the cooked mass will be caused.

Preferably, said tubular elements or circulation coils are arranged as helical volutes which lead from a head on the outer tube to another head on the outer tube situated at a 180° angle with the former, and there are disposed four longitudinal rows of heads on the outermost tube and four longitudinal series of helical volutes arranged at 90° angles within the cooked mass occupying the crystallizer (Fig. 2).

The water mixture of dissimilar temperatures obtained at the alternate heads of a row of heads and led through helical coils into the alternate heads of the row situated at a 180° angle with the former is divided partly into cooler water which is returned to the outermost annular space through the perforations at the base of the heads and partly into hotter water which is passed to the innermost tube through radial tubes ending from inside the head into holes formed in the inner concentric tube and is discharged to the outside through the open end of the latter tube by the initial impulse received at the heads of the first row by the impulse action of the streams of pressure injected cold water or hot water or steam.

In this manner the best desired results with the minimum consumption of water and with the maximum useful effect, with a greater uniformity of temperature throughout the cooked mass within the crystallizer and with the minimum difference of temperature between the cooked mass and the apparatus cooling or reheating surfaces.

The invention is described with reference to the figures of the accompanying drawings, of which:

Fig. 1 is a diametral longitudinal vertical section view of a crystallizer for sugar cooked mass, embodying the three concentric tubes forming the rotatable shaft of the crystallizer with the helical volute coils displayed outside the outermost tube, the intermediate tube being mounted on journal bearings disposed at the end walls of the crystallizer, and the innermost tube projecting beyond one of the ends of the second intermediate tube.

Fig. 3 is an enlarged diagrammatic view in diametral longitudinal vertical section showing the three concentric tubes with a pair of diametrally opposed heads on the outermost tube.

Fig. 4 is a transversal vertical section view on line 4—4 of Fig. 3, to best illustrate circulation through two diametrally opposed heads.

Fig. 5 is an elevational view of the body of the shaft formed by the three concentric tubes, showing the circularly arranged openings whereing through cold water or hot water under pressure penetrates in the annular space between the inner tube and the intermediate tube.

Figure 1:
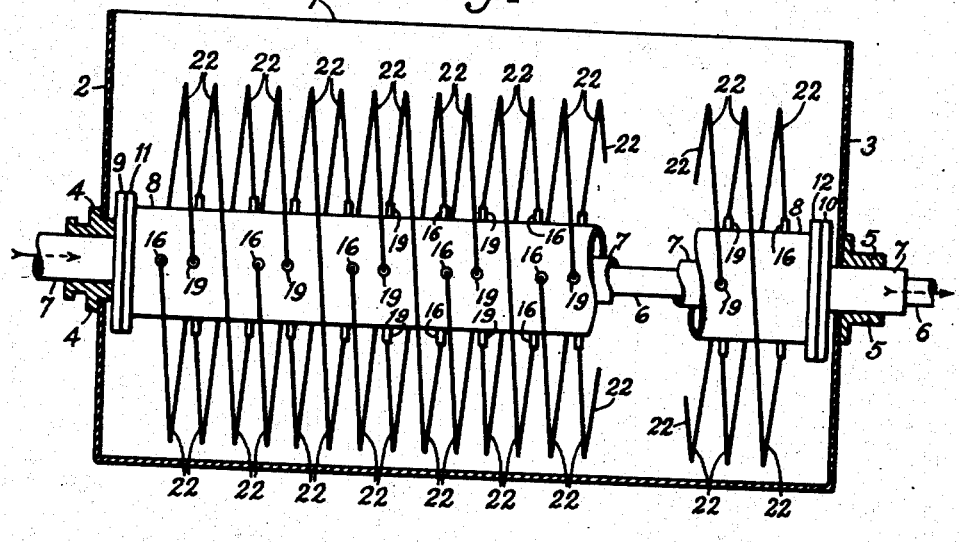

In the drawings, 1 indicates a crystallizer of the type which is usually employed for cooling sugar cooked masses at sugar factories and which as it is known is of a channeled or cross-section U shape and has vertical end walls 2 and 3 having secured thereto journal bearings 4 and 5 adapted to rotatably support lengthwise the crystallizer a rotatable shaft provided with blades adapted to rotate with the shaft, the blades and the shaft being conveniently shaped to carry out the uniform cooling or reheating method being the main object of this invention.

Said shaft is composed of three concentric tubes of dissimilar diameter 6, 7 and 8, of which the outer tube 8 is of a diameter quite greater than that of tubes 6 and 7, and tube 7 is rotatably mounted on end journal bearings 4 and 5 and has circular flanges 9 and 10 connected by screws with circular flanges 11 and 12 carried by the larger tube 8, said tube 7 being closed at one end (at the right-hand side in Fig. 1) and extended outside the opposed end (at the left-hand side in Fig. 1), whereas the smaller tube 6 is extended outside the crystallizer 1 beyond the closed end of the second tube 7.

Hot water or cold water fed by means of an injection pump or injected steam reaches the hollow space 13 between the concentric tubes 6 and 7 at one end (at the left-hand side in Fig. 1) through a plurality of openings 11' circularly arranged about the closed head of the smaller tube 6, and the water cooled or heated through the crystallizer is passed outside the crystallizer through smaller tube 6 to a suitable cooler 24 (Fig. 3) for recycling as herein described.

Figure 2:
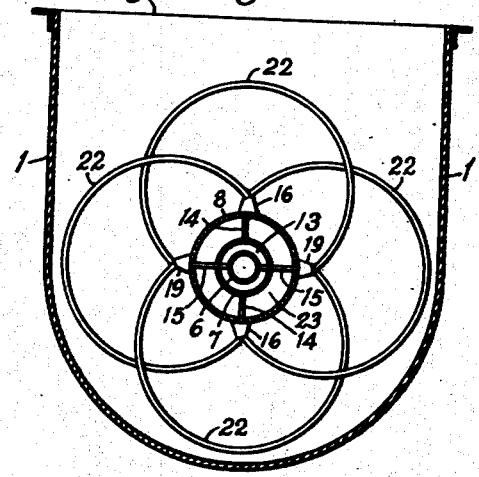
Fig. 2 is a transversal vertical section view of the same crystallizer.

The tubes 7 and 6 are respectively provided with four longitudinal rows spaced apart at a 90° angle of small tubes 14 and 15 in alternate arrangement. The tubes 14 lead radially from holes in the tube 7 and pass across corresponding holes formed in the outermost tube 8 to end within square-section heads 16 disposed in four longitudinal rows spaced apart at 90° angles from one another and secured on the outer periphery of the tube 8 by locking wings 17 and closed at their outer base, the same being provided at their inner base formed at the wall of a tube 8 with a plurality of perforations 18 about the radial tube 14, thereby communicating the hollow space 13 with the inside of the head 16 and the small tubes 15 lead from holes in the wall of tube 6 and pass across holes in the tubes 7 and 8 to end within the heads 19 shaped similarly as the heads 16 and alternately secured thereto on the outer periphery of the tube 8 by locking wings 20 and closed at their outer base, the same being provided at their inner base formed at the wall of tube 8 with a plurality of perforations 21 about the radial tube 15, thereby communicating the inside of innermost tube 6 with the inside of each head 19. And every two diametrally opposed heads 16 and 19 not at the same diametral plane are intercommunicated by tubular elements or coils 22 in the shape of a helical volute with the resulting arrangement of four longitudinal series of tubular elements 22, as it is seen in Fig. 2. Said tubular elements 22 extend across the inner space of the crystallizer 1 to permit a uniform cooling temperature through the cooked mass contained in the crystallizer and at the same time said elements act as agitator blades for the cooked mass, for same rotate along with the whole of concentric tubes 6, 7 and 8 which are inter-connected by the smaller radial tubes 14 and 15.

For effecting the cooling operation, a stream of cold water is injected under pressure by means of an outer pump into the open end of the tube 7 and into the hollow space 13 between tube 7 and tube 6 through the openings 11' of the closed end of tube 7. As cold water reaches each radial tube 14 the same is forced in a fine stream into the heads 16 where it becomes mixed with the hot water contained in the hollow space 23 between the outer tube 8 and the tube 7 and passing through perforations 18 at the lower base of the head 16, and said water mixture is impelled by the impulse of the fine streams thrown by the tubes 14 and caused to circulate within the helical volute tubes 22 communicating each head 16 with one diametrally opposed head 19, whereby the water heated within the tubes 22 by direct contact of the latter with the hot cooked mass within the crystallizer 1 partly returns to the hollow space 23 and partly enters through radial tubes 15 into the smaller outwardly open tube 6 to pass into the cooler 24 where it is cooled and then subjected to a further circulation by means of a pump injecting same into the hollow space 13 between the tubes 6 and 7 as aforesaid.

By means of the arrangement of the four longitudinal rows of helical volute tubes 22 at 90° angles from one another within the crystallizer 1 and by the impulse action exerted by the fine streams of cold water injected into the heads, a uniform cooling temperature is obtained in the cooked mass contained in the crystallizer, which has not heretofore been attained with the known cooling apparatus at the crystallizers used in the manufacture of sugar.

For reheating purposes, the above described operation is effected with steam or pressure hot water in fine streams.

It is obvious that changes may be made in the shape and number of the coils arranged outside the rotatable shaft of the crystallizer, without thereby altering the essential character of the invention, which is such as claimed hereinafter.

What I claim is:

1. In an apparatus for uniformly cooling or reheating cooked sugar masses, a crystallizer tank having vertical end walls, a rotatable shaft composed of three concentrically spaced tubes in said tank and rotatably supported in said end walls, said shaft including flange means for supporting said three tubes in concentrically spaced relation and forming in said shaft two separate concentric annular spaces and an innermost central space, a plurality of series of circularly curved tubular elements secured each with their two ends to diametrically opposed but axially displaced points to the outermost tube of said shaft so as to be in communication with the outermost annular space of the same, radial tube means extending from the intermediate tube of said shaft into one end of said tubular elements to conduct fluid from the innermost annular space in said shaft into said tubular elements, other radial tube means extending from the innermost tube of said shaft into the other end of said tubular elements to receive fluid from the same and conduct it into said innermost central space in said shaft, means extending through one of said end walls of said tank for connecting a source of fluid pressure with said innermost annular space in said shaft, and means connected with one end of said innermost tube for discharging fluid entering the same.

2. In an apparatus for uniformly cooling or reheating cooked sugar masses, a crystallizer tank having vertical end walls, a rotatable shaft composed of three concentrically spaced tubes in said tank and rotatably supported in said end walls, said shaft including flange means for supporting said three tubes in concentrically spaced relation and forming in said shaft two separate concentric annular spaces and an innermost central space, four series of circularly curved tubular elements secured each with their two ends to diametrically opposed, but axially displaced points to the outermost tube of said shaft so as to be in communication with the outermost annular space of the same, each of said four series of tubular elements being arranged in a longitudinal row extending lengthwise of the axis of said shaft, each tubular element in one row being displaced from an adjacent tubular element in the next adjacent row about an angle of 90°, radial tube means extending from the intermediate tube of said shaft into one end of said tubular elements to conduct fluid from the innermost annular space in said shaft into said tubular elements, other radial tube means extending from the innermost tube of said shaft into the other end of said tubular elements to receive fluid from the same and conduct it into said innermost central space in said shaft, means extending through one of said end walls of said tank for connecting a source of fluid pressure with said innermost annular space in said shaft, and means connected with one end of said innermost tube for discharging fluid entering the same.

3. In an apparatus for uniformly cooling or reheating cooked sugar masses, a crystallizer tank having vertical end walls, a rotatable shaft composed of three concentrically spaced tubes in said tank and rotatably supported in said end walls, said shaft including flange means for supporting said three tubes in concentrically spaced relation and forming in said shaft two separate concentric annular spaces and an innermost central space, a plurality of series of circularly curved tubular elements secured each with their two ends to diametrically opposed, but axially displaced points to the outermost tube of said shaft so as to be in communication with the outermost annular space of the same, radial tube means extending from the intermediate tube of said shaft into one end of said tubular elements to conduct fluid from the innermost annular space in said shaft into said tubular elements, other radial tube means extending from the innermost tube of said shaft into the other end of said tubular elements to receive fluid from the same and conduct it into said innermost central space in said shaft, means extending through one of said end walls of said tank for connecting a source of fluid pressure with said innermost annular space in said shaft, said means comprising an axial extension of said intermediate tube, said extension being rotatably supported in one of said end walls, the flange means at this end of said shaft closing the adjacent end of the innermost tube and having apertures connecting the innermost annular space of said shaft with the interior of said outward extension, and means connected with the other end of said innermost tube for discharging fluid entering the same.

4. In an apparatus for uniformly cooling or reheating cooked sugar masses, a crystallizer tank having vertical end walls, a rotatable shaft composed of three concentrically spaced tubes in said tank and rotatably supported in said end walls, said shaft including flange means for supporting said three tubes in concentrically spaced relation and forming in said shaft two separate concentric annular spaces and an innermost central space, four series of circularly curved tubular elements secured each with their two ends to diametrically opposed, but axially displaced points to the outermost tube of said shaft so as to be in communication with the outermost annular space of the same, each of said four series of tubular elements being arranged in a longitudinal row extending lengthwise of the axis of said shaft, each tubular element in one row being displaced from an adjacent tubular element in the next adjacent row about an angle of 90°, radial tube means extending from the intermediate tube of said shaft into one end of said tubular elements to conduct fluid from the innermost annular space in said shaft into said tubular elements, other radial tube means extending from the innermost tube of said shaft into the other end of said tubular elements to receive fluid from the same and conduct it into said innermost central space in said shaft, means extending through one of said end walls of said tank for connecting a source of fluid pressure with said innermost annular space in said shaft, said means comprising an axial extension of said intermediate tube, said extension being rotatably supported in one of said end walls, the flange means at this end of said shaft closing the adjacent end of the innermost tube and having apertures connecting the innermost annular space of said shaft with the interior of said outward extension, and means connected with one end of said innermost tube for discharging fluid entering the same.

5. In an apparatus for uniformly cooling or reheating cooked sugar masses, a crystallizer tank having vertical end walls, a rotatable shaft composed of three concentrically spaced tubes in said tank and rotatably supported in said end walls, said shaft including flange means for supporting said three tubes in concentrically spaced relation and forming in said shaft two separate concentric annular spaces and an innermost central space, a plurality of series of circularly curved tubular elements secured each with their two ends to diametrically opposed, but axially displaced points to the outermost tube of said shaft so as to be in communication with the outermost annular space of the same, said tubular elements extending outwardly from said outermost tube into the space of said tank and acting also as agitator members for the sugar mass adapted to be treated in said tank, radial tube means extending from the intermediate tube of said shaft into one end of said tubular elements to conduct fluid from the innermost annular space in said shaft into said tubular elements, other radial tube means extending from the innermost tube of said shaft into the other end of said tubular elements to receive fluid from the same and conduct it into said innermost central space in said shaft, means extending through one of said end walls of said tank for connecting a source of fluid pressure with said innermost annular space in said shaft, and means connected with one end of said innermost tube for discharging fluid entering the same.

LUIS M. IBAÑEZ RODRIGUEZ.

References Cited in the file of this patent

UNITED STATES PATENTS

| Number | Name | Date |
|---|---|---|
| 2,153,082 | Grill | Apr. 4, 1939 |
| 2,453,718 | Mason | Nov. 16, 1948 |
| 2,458,440 | Stafford | Jan. 4, 1949 |
| 2,540,250 | Feldstein | Feb. 6, 1951 |